(12) United States Patent
Haussler

(10) Patent No.: US 10,528,003 B2
(45) Date of Patent: Jan. 7, 2020

(54) LIGHT MODULATION DEVICE HAVING AN OPTICAL ELEMENT FOR SCATTERING LIGHT

(71) Applicant: SEEREAL TECHNOLOGIES S.A., Munsbach (LU)

(72) Inventor: Ralf Haussler, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 174 days.

(21) Appl. No.: 15/547,269

(22) PCT Filed: Jan. 20, 2016

(86) PCT No.: PCT/EP2016/051094
§ 371 (c)(1),
(2) Date: Oct. 4, 2017

(87) PCT Pub. No.: WO2016/120131
PCT Pub. Date: Aug. 4, 2016

(65) Prior Publication Data
US 2018/0299829 A1  Oct. 18, 2018

(30) Foreign Application Priority Data

Jan. 28, 2015 (DE) .......... 10 2015 101 203

(51) Int. Cl.
*G03H 1/12* (2006.01)
*G03H 1/22* (2006.01)
(Continued)

(52) U.S. Cl.
CPC ..... *G03H 1/2294* (2013.01); *G02F 1/133504* (2013.01); *G03H 1/02* (2013.01);
(Continued)

(58) Field of Classification Search
CPC .................. G03H 1/00; G03H 1/0005; G03H 2001/0083; G03H 2001/0088; G03H 1/02;
(Continued)

(56) References Cited

U.S. PATENT DOCUMENTS

| | | | |
|---|---|---|---|
| 6,002,505 A | 12/1999 | Kraenert et al. | |
| 7,218,435 B2 * | 5/2007 | Slinger | G02F 1/133504 356/330 |

(Continued)

FOREIGN PATENT DOCUMENTS

| | | | |
|---|---|---|---|
| WO | 2004/031841 A2 | 4/2004 | |
| WO | 2006108768 A1 | 9/2008 | |
| WO | WO-2015173558 A1 * | 11/2015 | ........... G03H 1/2205 |

OTHER PUBLICATIONS

International Search Report, dated Apr. 6, 2016, and Written Opinion, issued in International Application No. PCT/EP2016/051094.

*Primary Examiner* — Arnel C Lavarias
(74) *Attorney, Agent, or Firm* — Saul Ewing Arnstein & Lehr LLP

(57) ABSTRACT

A light modulation device for a display device, in particular a holographic display device, for the representation of two-dimensional and/or three-dimensional reconstructed scenes. The light modulation device includes at least one spatial light modulator including modulation elements for modulating incident light and an optical element of known optical characteristics. The light incident on the at least one spatial light modulator is sufficiently coherent. The at least one spatial light modulator and the optical element are combined with one another in such a way that the optical element scatters the unmodulated light emanating from the spatial light modulator into an angular range.

11 Claims, 3 Drawing Sheets

(51) Int. Cl.
    *G02F 1/1335* (2006.01)
    *G03H 1/02* (2006.01)
    *H04N 9/31* (2006.01)
    *G02B 5/02* (2006.01)
    *G02B 5/32* (2006.01)

(52) U.S. Cl.
    CPC ......... *G03H 1/2205* (2013.01); *H04N 9/3161* (2013.01); *G02B 5/021* (2013.01); *G02B 5/0252* (2013.01); *G02B 5/32* (2013.01); *G02F 2201/50* (2013.01); *G02F 2203/12* (2013.01); *G02F 2203/28* (2013.01); *G02F 2203/50* (2013.01); *G03H 2001/0224* (2013.01); *G03H 2001/2236* (2013.01); *G03H 2222/12* (2013.01); *G03H 2223/13* (2013.01); *G03H 2223/14* (2013.01); *G03H 2223/20* (2013.01); *G03H 2225/55* (2013.01)

(58) Field of Classification Search
    CPC ... G03H 2001/0208; G03H 2001/0212; G03H 2001/0216; G03H 2001/0224; G03H 2001/0228; G03H 1/04; G03H 1/0443; G03H 2001/045; G03H 1/08; G03H 1/0866; G03H 2001/0883; G03H 1/16; G03H 2001/2213; G03H 2001/2221; G03H 2223/00; G03H 2223/13; G03H 2223/14; G03H 2225/55
    USPC ........ 359/1, 3, 9, 11, 15, 22, 27, 29, 32, 33, 359/35; 430/1, 2
    See application file for complete search history.

(56) References Cited

U.S. PATENT DOCUMENTS

| | | |
|---|---|---|
| 7,839,548 B2 | 11/2010 | Schwerdtner |
| 2005/0242185 A1 | 11/2005 | Winkler et al. |
| 2011/0122467 A1* | 5/2011 | Futterer ............ G02F 1/133524 359/9 |

* cited by examiner

LIGHT MODULATION DEVICE HAVING AN OPTICAL ELEMENT FOR SCATTERING LIGHT

CROSS REFERENCE TO RELATED APPLICATIONS

This application claims the priority of PCT/EP2016/051094, filed on Jan. 28, 2016, which claims priority to German Application No. DE 10 2015 101 203.3, filed on 28 Jan. 2015, the entire contents of each of which are incorporated fully herein by reference.

BACKGROUND OF THE INVENTION

The invention relates to a light modulation device for a display device, in particular a holographic display device, for the representation of two-dimensional and/or three-dimensional reconstructed scenes by means of which, after the incorporation of the light modulation device into a display device, the risks resulting from the exposure of persons observing the display device to the light radiation emitting from a light source device are avoided. The invention also relates to a display device comprising such a light modulation device.

Light modulation devices are used mainly for modulating incident light in display devices, also referred to as displays. Such light modulation devices comprise modulation elements (so-called pixels), which modulate the incident light according to their control. These modulation elements are formed by a controllable layer in the light modulation device, which is mostly based on the use of liquid crystals (LC). In display devices, it is, of course, also possible to use light modulation devices that are not based on liquid crystals but are based, for example, on electrowetting or the use of micro-electro-mechanical systems (MEMS).

Light modulation devices, in particular for the holographic display of two-dimensional (2D) and/or three-dimensional (3D) reconstructed scenes, are mostly illuminated using a light source device that emits sufficiently coherent light. Such usable light sources are, for example, lasers or even LEDs (light emitting diodes). However, the use of lasers requires increased safety measures due to the possible serious danger of laser light for person exposed to the region of the laser beam. For example, burns at specific sites on the body of persons or damage to the eyes may occur, or even the loss of sight cannot be ruled out if laser light enters the eyes of persons. For this reason, when lasers of certain power are used, adequate safeguard measures need to be taken, such as complying with the safeguards set by the individual countries.

Regarding the safety of two-dimensional (2D) display devices using lasers as light sources, such as projectors or laser TV; these display devices usually comprise a scatter foil, which improves the homogeneity, to ensure the laser safety. As a result, the surface of the display device or the screen on which an image is projected, acts as a spatially incoherent illuminating surface that is imaged not on a single point but on the area of the eyes of persons.

A further option for obtaining a high laser safety is disclosed in DE 196 40 404 A1. The device for displaying images on a projection screen comprises an image-generating device and a laser as a light source, where the image-generating device can be operated in two operating modes, of which the first is the normal operating mode and the second is an operating mode where the laser radiation is harmless for persons. In order to avoid eye damage, the image-generating device is switched into the second operating mode when a sensor detects a person who is directly in the beam path of the laser.

When using holographic display devices, however, no such scatter foils as mentioned above can be used because coherent light is needed for a holographic reconstruction. The coherence of light is reduced or even destroyed by such scatter foils.

Usually a hologram is encoded into the light modulation device, where the hologram causes a scattering of light and distributes the light within the room during operation of the light modulation device, in other words, during the controlling of the light modulation device. However, it may become critical and dangerous to persons if the light modulation device or the control of the light modulation device fails, causing the entire light to enter or be brought into the focus of a diffraction order used, such as the zeroth diffraction order.

This will be explained briefly by the following example: A state-of-the-art holographic display device comprises a light source device, usually a laser light source, a spatial light modulator, beam-deflecting means, and beam-shaping means, for example lenses. The design and functioning of such a display device are described, for example, in DE 103 53 439 B4.

The display device and the figures of DE 103 53 439 B4 shall illustrate a state-of-the-art holographic display device and the present invention, where FIGS. 1 and 2 of the present invention shall illustrate the section of the display device of DE 103 53 439 B4, which is important for the invention only in principle. FIG. 1 shows a side view of a holographic display device 1. For reasons of clarity, the individual elements or components of the display device 1 are not illustrated here. The display device 1 comprises, for example, a light source device, a spatial light modulator as well as beam-deflecting means and/or beam-shaping means. The light modulated in the display device 1 exits said display device in a bundle of light beams 2 and illuminates a virtual viewing window 3. A three-dimensional (3D) scene 4 is visible through this virtual viewing window 3 as a holographic reconstruction when one eye of an observer coincides with the position of the virtual viewing window 3. Here, the virtual viewing window 3 is positioned in the Fourier plane of the spatial light modulator. A field lens focuses the light emanating from the spatial light modulator, where the focus of the field lens is in the plane of the viewing window 3. FIG. 2 illustrates how, in the direction of light propagation, the bundle of light beams 2 form a focus F behind the holographic display device 1 if the spatial light modulator allows the light to be passed in an unmodulated state. This may be the case, for example, in the event of a malfunction of the holographic display device 1, where control means for controlling the spatial light modulator and the beam-deflecting means do not function properly.

Focusing the bundle of light beams 2 on a focus F affects the laser safety of the display device 1 and can compromise the health of the observers' eyes. On the one hand, all the light in the bundle of light beam 2 is focused on the focus F and can, therefore, hit completely an observer's eye or eye pupil. According to FIG. 1, the light is usually distributed over the area of the viewing window 3, thus only partially hitting an observer's eye or eye pupil. On the other hand, concerning the laser safety of a holographic display device, the angular extension of the light source used is to be considered. According to the Accident Prevention Regulation BGV B2 "Laser Radiation" (German laser safety regulation BGV B2 that is compatible with international regulation IEC 60825), this angular extension is included both in a correction factor $C_6$, which is required by the Accident Prevention Regulation BGV B2 "Laser Radiation", and in the calculation of the maximum permissible radiation. A light source having a small angular extension is imaged on a small area of the retina of an eye and is hence more dangerous than a light source having a larger angular extension of the same power. A light source having a small angular extension is the case when there are no scattering optical elements in the beam path of the laser light. In this case, there is a diffraction-limited point image of the light source on the retina of the eye. On the other hand, there is, among others, a light source having a large angular extension when, according to FIG. 1, a three-dimensional scene 4 having a spatial extension is reconstructed holographically and imaged on the retina of the eye.

Hence, a malfunction of the holographic display device can lead particularly to eye damage of an observer caused by laser radiation.

SUMMARY OF THE INVENTION

Therefore, it is an object of the present invention to provide a display device for the representation of two-dimensional and/or three-dimensional scenes by which a hazard to observers, in particular a hazard to eyes of observers, due to powerful light sources can be avoided, even in the case of a malfunction of the display device or light modulation device.

This object is achieved according to the invention by the teachings of claims 1 and 9.

A light modulation device according to the invention for a display device, in particular a holographic display device, for the representation of two-dimensional and/or three-dimensional reconstructed scenes comprises at least one spatial light modulator comprising modulation elements for modulating incident light and an optical element of known optical characteristics. The light incident on the at least one spatial light modulator is sufficiently coherent. The at least one spatial light modulator and the optical element are combined with one another such that the optical element scatters the unmodulated light, which emanates from the spatial light modulator, in an angular range. By providing an optical element in the light modulation device, the light will not be focused but scattered in the event of a failure of the spatial light modulator and/or the control of the spatial light modulator, or a malfunction of the control of the spatial light modulator or the spatial light modulator itself, or the display device, so that a hazard to persons/observers observing the reconstructed scenes, in particular a damage of eyes of the observers, can be eliminated or avoided. In other words, in addition to the existing components or elements, particularly the holographic display device comprises an optical element, which scatters the incident light in a spatial angular range. Herein, the characteristics of the optical element are known. As a result, when the display device or the light modulation device functions correctly, a preferably three-dimensional scene is holographically reconstructed, so that it can be observed by an observer. In the event of a malfunction of the light modulation device or the display device, the bundle of light beams emanating from the light modulation device will not be focused into a focus but will be distributed over an area in a plane, for example, the Fourier plane, of the spatial light modulator, due to the scattering properties of the optical element. Thus, a hazard to or damage of the eyes of one or several observers of the reconstructed scene is avoided. This ensures a high level of passive laser safety. Here, the term 'passive laser safety' is to be understood as an avoidance of a hazard or damage to one or several observers/persons, even in the event of a failure or malfunction of the control means for controlling the light modulation device and/or the beam-deflecting/beam-shaping elements, and/or in the event of a failure or malfunction of the light modulation device itself or the display device, respectively. Hence, a risk to persons is avoided not only during the operation of the light modulation device but also during a failure or malfunction of the light modulation device. Furthermore, the term 'laser safety' does not cover only lasers as light sources but also other light sources that generate sufficiently coherent light such as light-emitting diodes (LEDs), which can present a risk to persons due to their high power.

The light modulation device according to the invention can be used in a display device, in particular in a holographic display device, for the representation of two-dimensional and/or three-dimensional reconstructed scenes according to claim 9, furthermore comprising an illumination device for emitting sufficiently coherent light and at least one optical system for light beam shaping and/or light beam deflection, in order to ensure a high level of laser safety for one or several observers watching the reconstructed scenes.

Further advantageous embodiments and developments of the invention are defined in the dependent claims.

In a preferred embodiment of the invention it may be provided that the optical element comprises a plurality of cells, where during the passage of light through a cell of the optical element the light undergoes a phase modulation known for each cell of the optical element. The phase modulation depends on the thickness of the individual cells, the difference in refractive indexes of the optical element and the surrounding medium as well as on the wavelength of the light used. Thus, herein the phase modulation serves as an example of the known characteristics of the optical element.

In a further advantageous embodiment of the invention it may be provided that a cell of the optical element is assigned to each modulation element of the spatial light modulator. In this way, there is a fixed assignment of pixels, that is, the number of cells of the optical element equals the number of modulation elements (pixels) of the spatial light modulator. Such a 1:1 assignment of these elements has the advantage that the phase modulation of each cell of the optical element can be compensated in the corresponding modulation element of the spatial light modulator. If more cells of the optical element are available, these cells cannot be compensated individually, resulting in an insufficient compensation. Although the presence of fewer cells of the optical element is possible, the protective effect might be reduced in this case. To conclude, a 1:1 assignment of the cells of the optical element to the modulation elements of the spatial light modulator is an ideal ratio. However, other ratios of assignment of these two elements to one another are possible as well.

It may also be possible that other ratios of the number of cells of the optical element to the number of modulation elements are to be used due to their producibility. Thus, also a plurality of or several adjacent modulation elements may be assigned to the same cell of the optical element. This, in turn, has the advantage that the cells of the optical element can be larger, and the optical element can thus be produced in a simpler manner. A cell of the optical element can, for example, be as large as 5×5 modulation elements.

Advantageously, it can be provided that the known characteristics of the optical element are considered when calculating a hologram to be encoded into the spatial light modulator. The scattering behavior of the optical element is thus considered when calculating the hologram or is included in the calculation of the hologram, respectively. The known characteristics of the optical element may include the phase modulation of light at the cells, which can be set off against the phase modulation of light in each of the modulation elements (pixels) of the spatial light modulator, so that the scattering of light by the optical element is compensated when the light modulation device or the display device, respectively, are operating correctly; and the optical element has no effect on the reconstruction of a scene.

Furthermore, in a further advantageous embodiment of the invention it may be provided that the spatial light modulator and the optical element are arranged adjacent to one another or that the optical element is integrated into the spatial light modulator. This may ensure a direct assignment of the cells of the optical element to the modulation elements (pixels) of the spatial light modulator. This may help to prevent the light diffraction at the modulation elements (pixels) from preventing or impairing a direct assignment of the two elements to one another in the case of a greater distance of the optical element to the spatial light modulator. Advantageously, the optical element can be integrated in a substrate, in particular in a cover glass, of the spatial light modulator.

Further embodiments of the invention are disclosed in the remaining dependent claims. Below, the invention is illustrated in principle with reference to an exemplary embodiment explained in more detail in the figures. The principle of the invention is explained herein with reference to a holographic reconstruction using coherent light.

DETAILED DESCRIPTION OF THE INVENTION

Figure 1:
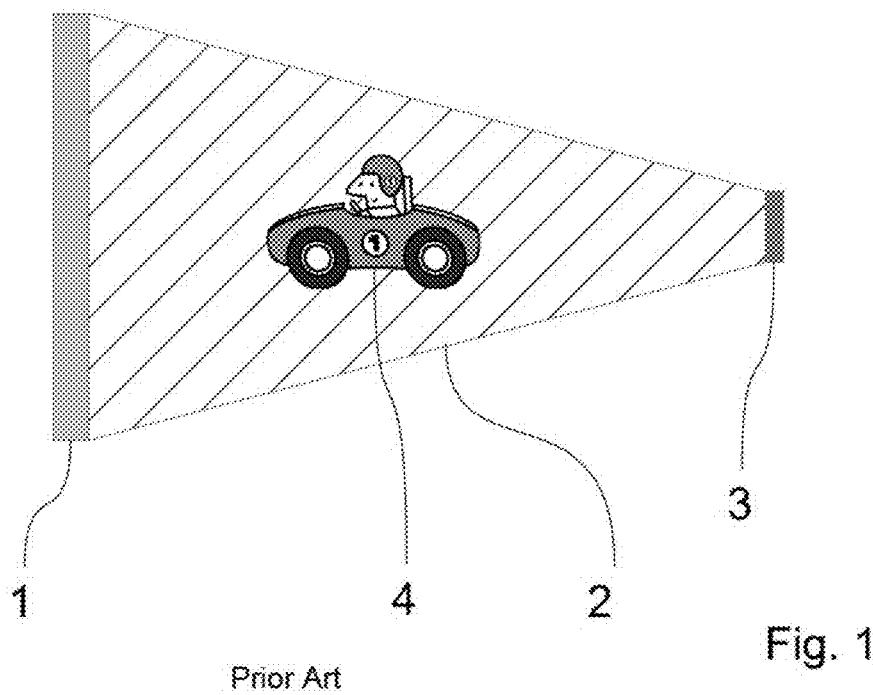
FIG. 1 a schematic representation of a side view of a holographic state-of-the-art display device, FIG. 2 the holographic display device according to FIG. 1 during the non-modulation of the light by a spatial light modulator, FIG. 3 a side view of a holographic display device according to the invention, comprising a scattering optical element, FIG. 4 the holographic display device according to the invention according to FIG. 3 during the correct functioning of the holographic display device, and FIG. 5 a light modulation device comprising the scattering optical element according to the invention.
Figure 2:
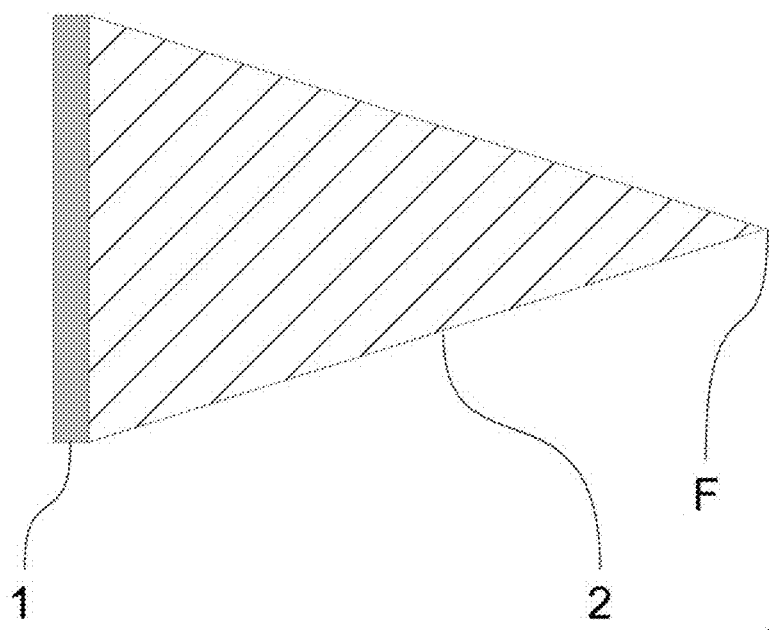

The holographic display apparatus according to DE 103 53 439 B4 and FIGS. 1 and 2 explained herein shall be used to illustrate the light modulation device according to the invention and the display device according to the invention.

Figure 3:
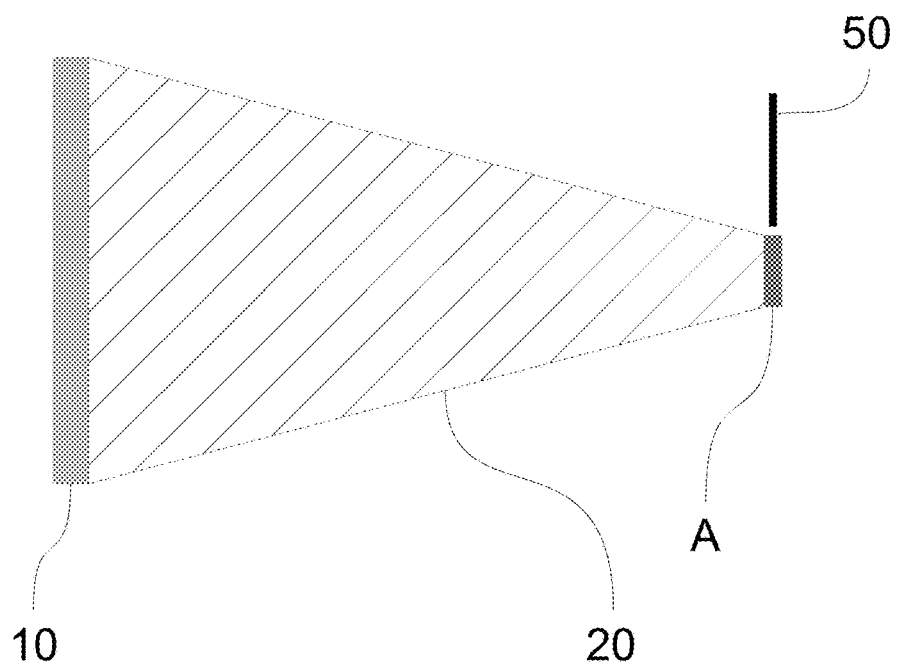

FIG. 3 shows a side view of particularly a holographic display device 10 according to the invention, where the drawing is purely schematic. The display device 10 comprises an optical element having known optical characteristics, which is illustrated in detail in FIG. 5. The display device 10 is in an operating mode in which a spatial light modulator (SLM) allows the light emitting by a light source device and incident on the spatial light modulator to be passed in an unmodulated state. This operating mode can result, for example, in the case of a malfunction of particularly the holographic display device 10, where control systems for controlling the spatial light modulator and/or control systems of the beam-deflecting/beam-shaping elements do not function properly or correctly, respectively.

The scattering effect of the optical element not shown separately in FIG. 3 ensures that a bundle of light beams 20 emanating from the particularly holographic display device 10 is distributed over an area A in a plane 50, here the Fourier plane, of the spatial light modulator. In order to be able to observe a scene that is reconstructed using the display device 10, an observer needs to be in or near this plane 50, here the Fourier plane, of the spatial light modulator. Due to the fact that the observer is now in or near the plane 50, the intensity of light is lower than it is in the case illustrated in FIG. 2. The hazard to the eyes of an observer watching a scene to be reconstructed by laser radiation is, therefore, reduced.

Figure 4:
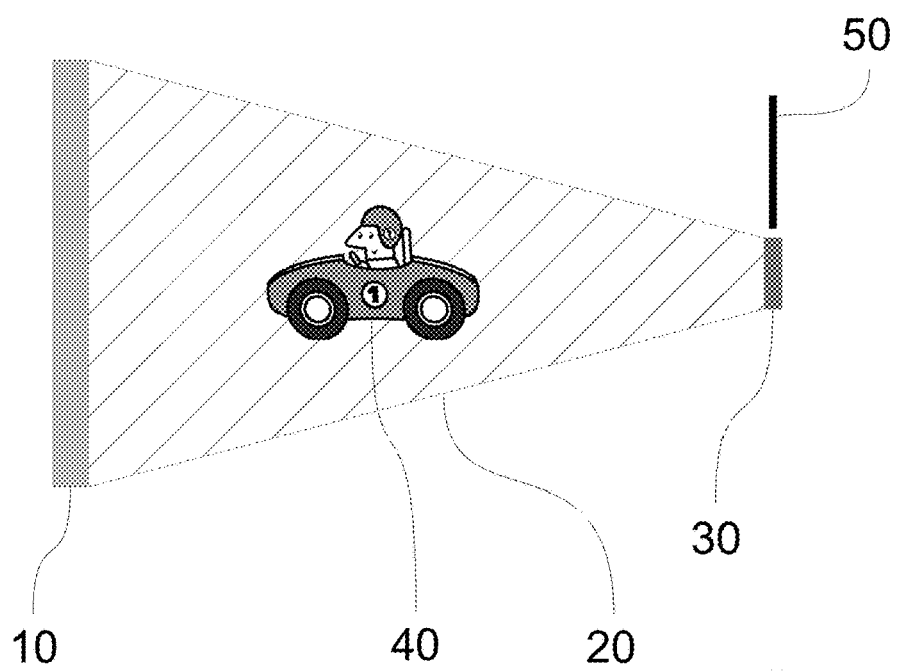

The scattering effect of the optical element is considered when calculating a hologram for the spatial light modulator. This is shown in FIG. 4; that is, how, in the case of a correct functioning of the particularly holographic display device 10, the scattering effect of the optical element is included and compensated in the calculation of the hologram. Thus, a two-dimensional and/or three-dimensional (3D) scene 40 is reconstructed correctly in a holographic manner, where this reconstructed scene is visible through a virtual viewing window 30.

Figure 5:
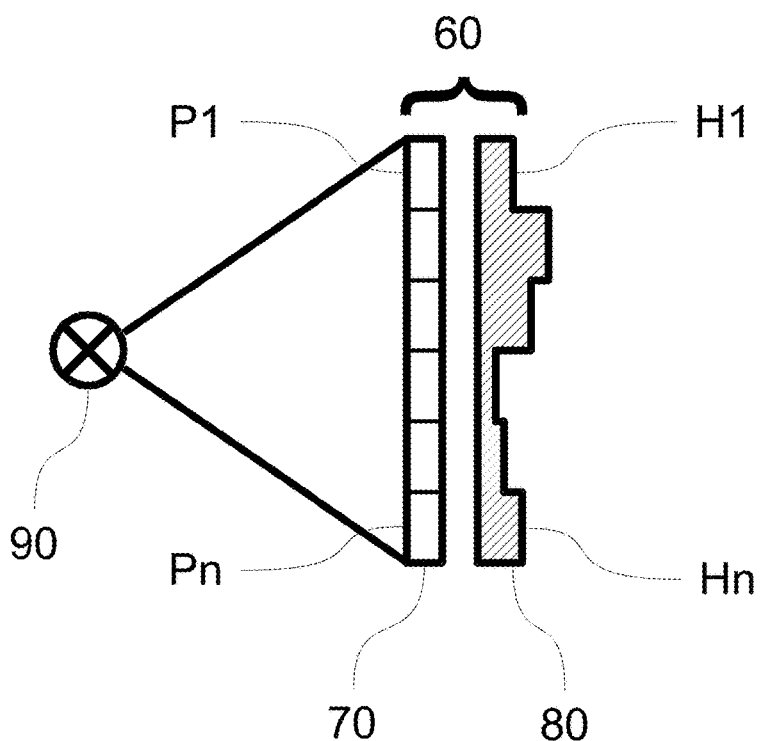

FIG. 5 shows a light modulation device 60 comprising a spatial light modulator 70 and an optical element 80 having known optical characteristics. The spatial light modulator 70 comprises modulation elements for modulating incident light. The modulation elements are designed as modulator cells P1 . . . Pn, where the spatial light modulator 70 can, for example, be designed as a liquid crystal light modulator. The modulator cells P1 . . . Pn of the spatial light modulator 70 modulate the light incident on them in phase and/or amplitude. The spatial light modulator 70 is illuminated by means of an illumination device 90 emitting sufficiently coherent light; and it is designed, for example, as a point light source; in particular as a laser array, light emitting diode array or OLED array (organic light-emitting diodes).

In this embodiment, the optical element 80 is designed as a surface relief, in particular as a phase mask. A cell H1 . . . Hn of the optical element 80 is assigned to each modulation element or each modulator cell P1 . . . Pn, respectively, as can be seen in FIG. 5. It is, however, also possible to assign a plurality of adjacent modulation elements to the same cell of the optical element, for example, if required by production processes. During its passage through a cell H1 . . . Hn, the light incident on the optical element 80 undergoes a phase modulation, which depends on the thickness of the cell H1 . . . Hn, the difference in refractive indexes of the optical element 80 and the medium surrounding the optical element 80, such as air or gas, as well as on the wavelength of the light used. Thus, the phase modulation is known for each of the cells H1 . . . Hn. That means that the optical characteristics of the optical element 80 are known or predetermined.

The spatial light modulator 70 and the optical element 80 are arranged in the light modulation device 60 in such a way that, in the direction of light propagation, they directly succeed one another or are arranged adjacent to one another. In this way, a direct assignment of modulator cells P1 . . . Pn of the spatial light modulator 70 and cells H1 . . . Hn of the optical element 80 can be ensured. With a greater distance of the spatial light modulator 70 to the optical element 80, light diffraction at the modulator cells P1 . . . Pn of the spatial light modulator 70 can affect the direct assignment of the two elements 70 and 80 to one another. As an alternative, it is, of course, possible to integrate the optical element directly into the spatial light modulator 70; for example, into a cover glass of the spatial light modulator. The order in which the spatial light modulator 70 and the optical element 80 are arranged, can, however, be modified.

Statistically speaking, the thicknesses of the cells H1 . . . Hn of the optical element 80 are distributed equally or, at least approximately equally and dimensioned such that, for the shortest wavelength of illuminating light, the phase modulation in the cells H1 . . . Hn is equally or, at least approximately equally distributed within a range of 0 to $2\pi$. Consequently, the optical element 80 scatters the light incident on and phase-modulated by the optical element 80 in an angular range if the modulator cells P1 . . . Pn of the spatial light modulator 70 allow the incident light to be passed in an unmodulated state. This can be the case, for example, during a malfunction of a control system of the spatial light modulator 70 if the modulator cells P1 . . . Pn of the spatial light modulator 70 are not being controlled, for example, due to a failure of power supply. In this case, the bundle of light beams 20 emanating from the display device 10 is scattered into an extensive area A in the plane 50, as can be seen in FIG. 3. Thus, the intensity at the eyes and the hazard to the eyes of an observer caused by laser radiation are significantly lower than if a state-of-the-art holographic display device 1 according to FIG. 2 is used.

During the correct functioning or correct operating of the particularly holographic display device 10, the phase modulation at the cells H1 . . . Hn of the optical element 80 is considered when calculating a hologram to be encoded into the spatial light modulator 70 and when controlling the spatial light modulator 70. In this case, the phase modulation in each of the modulator cells P1 . . . Pn is reduced by the phase modulation or is set off against it, which the light undergoes in the associated cell H1 . . . Hn of the optical element 80. Thus, the scattering effect of the optical element 80 is compensated in the spatial light modulator 70, whereby a holographic reconstruction of the three-dimensional (3D) scene 40 is visible from a virtual viewing window 30.

Below, the protective effect of the invention described herein will be illustrated by means of an example.

The display device comprises a spatial light modulator with a pitch of 20 μm, where an illumination device, which emits light with a wavelength of 532 nm, is used and where a distance of 0.75 m is provided between the display device and an observer's eye. These parameters lead to a periodicity interval having an extension of 20 mm in the plane as indicated by the reference numeral 50 according to FIGS. 3 and 4, here the Fourier plane, of the spatial light modulator. This periodicity interval is used as a virtual viewing window from which an observer can observe a reconstructed scene. The surface of both the spatial light modulator and the optical element is 400 mm×300 mm, where this serves only as an example, as indicated above.

The optical element reduces the radiation exposure of one or both eye(s) of an observer in the event of a malfunction of the particularly holographic display device, here due to two mechanisms:

(1) According to the Accident Prevention Regulation BGV B2 "Laser Radiation" (German laser safety regulation BGV B2 that is compatible with international regulation IEC 60825), the radiation exposure of the eye is measured using a measuring aperture of 7 mm diameter. Assuming that the area A according to FIGS. 3 and 4 and the virtual viewing window have at least approximately the same size and that, in the event of a malfunction of the herein holographic display device, the intensity of the bundle of light beams indicated by the reference numeral LB in FIGS. 3 and 4 in the virtual viewing window is at least approximately constant, then 9.6% of the light in the virtual viewing window enters the measuring aperture. If, in turn, a state-of-the-art holographic display device is used and if it is malfunctioning, then 100% of the light in the virtual viewing window enters the measuring aperture. Thus, the first mechanism reduces the radiation exposure of the eye by a factor of 10.4 (100% divided by 9.6%).

(2) The scattering effect of the optical element causes the optical element to be perceived as a spatially incoherent illuminating area in the event of a malfunction of the holographic display device. In this way, the light source of the illumination device according to the Accident Prevention Regulation BGV B2 "Laser Radiation" has an angular extent of α>100 mrad. This results in a correction factor C6=66.7 (the correction factor C6 is required by the Accident Prevention Regulation BGV B2 "Laser Radiation") according to the Accident Prevention Regulation BGV B2 "Laser Radiation". The second mechanism, therefore, reduces the radiation exposure of the eye by a factor of 66.7.

Thus, in the case of a malfunction of the light modulation device or the display device, the radiation exposure of the eye is reduced by a factor of 694 (factor 66.7 multiplied by the factor of 10.4).

As an alternative, the optical element can be designed as an in-cell retarder (an element provided with an integrated retardation layer). By combining materials of different refraction powers or of different doping, a structured layer having a uniform layer thickness can be generated on a substrate or in a substrate of the spatial light modulator, so that a uniform layer thickness of the addressable layer of the spatial light modulator will be maintained.

An in-cell retarder could be based on, for example, liquid crystals (LC) or photopolymer. In other words, the in-cell retarder could already be integrated in the modulation element (pixel).

The use of a spatial light modulator based on liquid crystals with normally black mode (spatial light modulator with a black 'off state') further increases the laser safety; depending, however, on the configuration of the spatial light modulator used. Herein, the term 'normally black mode' is to be understand that, when applying a voltage of U=0 V or when not applying a voltage to the spatial light modulator, each single pixel is not transparent or is not translucent, or can be considered as black in this state.

Concerning laser safety, a spatial light modulator with normally black mode is beneficial only if the spatial light modulator is configured as a sandwich of an amplitude-modulated and a phase-modulated spatial light modulator. The optical element having a scattering effect provides a higher safety even if such a spatial light modulator with normally black mode is used. If a spatial light modulator that is a pure phase light modulator is used, however, a normally black mode offers no safety in the case of its malfunction because the incident light can continue to pass the pixels. If a spatial light modulator that is designed as a phase light modulator comprising a beam combiner is used, a normally black mode is largely beneficial only if the optical paths in the beam combiner are adjusted such that there is destructive interference in normally black mode. This, however, would be very difficult to realize at the moment because the interference is very sensitive to path differences, such as variations in the thickness of a cover glass of the spatial light modulator in combination with a beam combiner in the sub-λ (wavelength) range.

Thus, according to the invention, the laser safety of a particularly holographic display is increased significantly. Particularly important in this regard is the passive safety, which is guaranteed even in the event of a failure of control means in the display device or in the light modulation device.

In conclusion, it shall explicitly be pointed out that the exemplary embodiment described above serves only to describe the teaching claimed, but does not limit it to the exemplary embodiment. Particularly, the exemplary embodiment described above can comprise other embodiments, where possible.

The invention claimed is:

1. A light modulation device for a display device for a representation of at least one of two-dimensional and three-dimensional reconstructed scenes, comprising
at least one spatial light modulator comprising modulation elements for modulating incident light,
an optical element of known optical characteristics,
the light incident on the at least one spatial light modulator is sufficiently coherent, and
the at least one spatial light modulator and the optical element are combined with one another such that the optical element scatters unmodulated light emitted by the spatial light modulator in an angular range.

2. The light modulation device according to claim 1, wherein the optical element comprising a plurality of cells, where during a passage of light through a cell of the optical element the light undergoes a phase modulation, which is known for each cell of the optical element.

3. The light modulation device according to claim 2, wherein a cell of the optical element is assigned to each modulation element of the spatial light modulator.

4. The light modulation device according to claim 2, wherein a plurality of adjacent modulation elements is assigned to the same cell of the optical element.

5. The light modulation device according to claim 1, wherein the known characteristics of the optical element can be considered when calculating a hologram to be encoded into the spatial light modulator.

6. The light modulation device according to claim 2, wherein the cells of the optical element each have a thickness that, statistically speaking, is distributed at least approximately equally and dimensioned such that for a shortest wavelength of the illuminating light the phase modulation in the individual cells is equally distributed within a range of 0 to $2\pi$.

7. The light modulation device according to claim 1, wherein the spatial light modulator and the optical element are arranged adjacent to one another or the optical element is integrated into the spatial light modulator.

8. The light modulation device according to claim 1, wherein the optical element is designed as a surface relief or as an in-cell retarder.

9. A display device for a representation of at least one of two-dimensional and three-dimensional reconstructed scenes comprising an illumination device for emitting sufficiently coherent light, at least one optical system for at least one of light beam shaping and light beam deflection and a light modulation device according to claim 1.

10. The display device according to claim 9, wherein the display device is a holographic display device.

11. The light modulator device according to claim 8, wherein the optical element is designed as a phase mask.

* * * * *